UNITED STATES PATENT OFFICE.

GILBERT DÉCLAT, OF PARIS, FRANCE.

IMPROVEMENT IN MEDICAL COMPOUNDS.

Specification forming part of Letters Patent No. 145,850, dated December 23, 1873; application filed December 2, 1873.

*To all whom it may concern:*

Be it known that I, GILBERT DÉCLAT, of Paris, France, doctor, have invented Preparations and Applications of a new Compound for Medical Purposes, of which the following is a specification:

Hitherto the phenic acid or carbolic acid has been generally employed only as an antiseptic and disinfecting agent. I have discovered that, for employing the same in medicine, principally for the treatment of the epidemic illnesses, or illnesses proceeding from a healthy ferment, it is indispensable to combine the said acid with special elements intended for completing its efficiency. There are the ammonia and the sulphydric acid, which have been indicated to me by experience as the matters being the most capable in order to obtain the proposed object. Such is the principle of my present invention, which consists of the preparation and the application of a new compound of phenic acid, ammonia, and sulphydric acid, which I call "ammoniacal sulpho-phenic acid," for several medical purposes.

The process for obtaining my compound includes two preparations. I will first describe the means of producing the ammoniacal preparation which serves as a base for the composition of the ammoniacal sulpho-phenic acid, which constitutes my invention.

First preparation of the compound.—The first preparation, which I call "ammoniacal phenic acid," is obtained by passing a current of ammoniacal gas, very dry, upon rectified, pure, and very white phenic acid, contained in any vessel. The operation is continued until saturation. The matter is sufficiently hot in order to liquefy the mass, and the liquefaction may be accelerated, if that is necessary, by eating the vessel during the passage of the current of gas.

Second preparation.—The second preparation, which I call "ammoniacal sulpho-phenic acid," is as follows: After the first preparation is made—that is to say, after the phenic acid is completely saturated with ammoniacal gas—I let a current of sulphydric acid penetrate into this preparation, the said acid being equally dry, and with exclusion of the air. The product which proceeds from this second preparation is my new compound.

The following is the mode of employing the new compound:

My compound may be employed either for external or internal use.

External use.—First employment: My compound, mixed with pure water, with or without glycerine, in the proportion of from one-half to three per cent., forms a very useful solution in order to treat illness of the skin, the itch, &c. Second employment: Mixed with axunge, in the proportion of from three to ten per cent., it forms a pomada, serving for the same uses as before described.

Internal use.—My compound, mixed with sugar sirup, in the proportion of from one to two and one-half per cent., constitutes a special sirup, and almost a specific against illness of the skin, chronic bronchitis, catarrh of the bronchia, of the cystis, and even of the intestines.

In some cases the first preparation of my compound, which I have called "ammoniacal phenic acid," may be usefully employed either for external or internal uses, as I will hereinafter describe.

The following is the mode of employing the first preparation of my new compound:

External use.—First employment: The ammoniacal phenic acid, such as it is retired from the vessel of saturation, can be employed pure only for external use, for instance, the cauterization of anthrax, unhealthy wounds, venomous stings, &c. Second employment: Mixed with alcohol, in the proportions of one part of ammoniacal phenic acid to two parts of alcohol, it serves to cauterize the less grave but doubtful stings proceeding from bees, scorpions, &c.

Internal use.—First employment: Mixed with distilled water, in the proportion of from one to two and one-half per cent., it constitutes the liquor employed as sub-cutaneous injections in cases of cholera, vomito-negro, grave typhoid fever, and illnesses with ferment and rapid evolutions. Second employment: Mixed with sugar sirup, in the proportion of one and one-half per cent., and introduced into the stomach, the said preparation acts in concurrence with the sub-cutaneous injections in order to cure the same illness.

I claim—

The preparations and the applications before described of the phenic acid incorporated with the ammonia and with the sulphydric acid in order to constitute, first, a previous compound, which I name "ammoniacal phenic acid," and, secondly, a completed compound, which I name "ammoniacal sulpho-phenic acid," substantially as before described, and for the purposes set forth.

In testimony whereof I have signed my name to this specification before two subscribing witnesses.

DR. DÉCLAT.

Witnesses:
   LEONARD DEL MONTE,
   ALBERT CAHENT.